United States Patent
Zhao et al.

(10) Patent No.: US 12,382,082 B2
(45) Date of Patent: Aug. 5, 2025

(54) SYSTEMS AND METHODS FOR SUBBLOCK MOTION VECTOR CODING

(71) Applicant: Tencent America LLC, Palo Alto, CA (US)

(72) Inventors: Xin Zhao, Palo Alto, CA (US); Guichun Li, Palo Alto, CA (US); Lien-Fei Chen, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 42 days.

(21) Appl. No.: 18/209,822

(22) Filed: Jun. 14, 2023

(65) Prior Publication Data

US 2024/0089487 A1    Mar. 14, 2024

Related U.S. Application Data

(60) Provisional application No. 63/405,274, filed on Sep. 9, 2022.

(51) Int. Cl.
*H04N 19/513* (2014.01)
*H04N 19/176* (2014.01)
*H04N 19/70* (2014.01)

(52) U.S. Cl.
CPC ......... *H04N 19/513* (2014.11); *H04N 19/176* (2014.11); *H04N 19/70* (2014.11)

(58) Field of Classification Search
CPC ..... H04N 19/70; H04N 19/176; H04N 19/513
See application file for complete search history.

(56) References Cited

U.S. PATENT DOCUMENTS

| | | | |
|---|---|---|---|
| 2017/0214932 A1* | 7/2017 | Huang | H04N 19/70 |
| 2018/0098089 A1* | 4/2018 | Chen | H04N 19/136 |
| 2019/0191177 A1* | 6/2019 | He | H04N 19/157 |

(Continued)

FOREIGN PATENT DOCUMENTS

| | | | |
|---|---|---|---|
| WO | WO-2020047132 A1 * | 3/2020 | H04N 19/109 |
| WO | WO 2020073882 A1 | 4/2020 | |

OTHER PUBLICATIONS

Tencent Technology, ISRWO, PCT/US2023/025975, Sep. 19, 2023, 11 pgs.

*Primary Examiner* — Dave Czekaj
*Assistant Examiner* — Shanika M Brumfield
(74) *Attorney, Agent, or Firm* — Morgan, Lewis & Bockius LLP

(57) ABSTRACT

The various embodiments described herein include methods and systems for encoding and decoding video. In one aspect, a method includes receiving a video bitstream comprising a plurality of blocks, including a first block, where the first block includes a plurality of subblocks. The method also includes determining, based on a syntax element value in the video bitstream, that the first block is predicted in a subblock mode. The method further includes, in accordance with the first block being predicted in the subblock mode: deriving a set of motion vector predictors (MVPs) corresponding to a plurality of subblocks of the first block; deriving a set of motion vector differences (MVDs) for the plurality of subblocks; determining a set of motion vectors for the plurality of subblocks by applying the set of MVDs to the set of MVPs; and reconstructing the first block using the set of motion vectors.

19 Claims, 10 Drawing Sheets

(56) References Cited

U.S. PATENT DOCUMENTS

| | | | |
|---|---|---|---|
| 2020/0014931 A1 | 1/2020 | Hsiao et al. | |
| 2020/0045310 A1* | 2/2020 | Chen et al. | |
| 2020/0304805 A1* | 9/2020 | Li | H04N 19/80 |
| 2021/0021856 A1* | 1/2021 | Zheng | H04N 19/176 |
| 2021/0105481 A1* | 4/2021 | Kim | H04N 19/176 |
| 2021/0203947 A1 | 7/2021 | He et al. | |
| 2021/0360279 A1* | 11/2021 | Liu | H04N 19/46 |

* cited by examiner

SYSTEMS AND METHODS FOR SUBBLOCK MOTION VECTOR CODING

RELATED APPLICATIONS

This application claims priority to U.S. Provisional Patent Application No. 63/405,274, entitled "Subblock MVD Transform Coding" filed Sep. 9, 2022, which is hereby incorporated by reference in its entirety.

TECHNICAL FIELD

The disclosed embodiments relate generally to video encoding and decoding, including but not limited to systems and methods for subblock motion vector coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, a video stream can be encoded into a bitstream that involves compression and then transmission to a decoder that can decode/decompress the video stream in preparation for viewing or further processing. Compression of video streams can exploit the spatial and temporal correlation of video signals by spatial and/or motion compensated prediction. Motion compensated prediction can include inter prediction. Inter prediction can use one or more motion vectors to generate an encoded block using previously encoded and decoded pixels. A decoder receiving the encoded signal can recreate the block. As used herein, the term block may be interpreted as a prediction block, a coding block, or a coding unit (CU) depending on context.

In conventional subblock motion modes, the subblock motion vectors may be estimated based on a coded motion vector field or assumptions on a specific motion model. However, the optimal subblock motion vectors may not follow the assumptions on the motion model. Therefore, these subblock motion modes don't allow for customized assignment of the motion vector of every subblock by an encoder or decoder.

In accordance with some embodiments, a method of video decoding is performed at a computing system having memory and one or more processors. The method includes: (i) receiving video data comprising a plurality of blocks, including a first block, from a video bitstream; (ii) obtaining a set of motion vector predictors (MVPs) corresponding to a plurality of subblocks of the first block; (iii) obtaining a set of motion vector differences (MVDs) for the plurality of subblocks; (iv) obtaining a set of motion vectors for the plurality of subblocks by applying the set of MVDs to the set of MVPs; and (v) reconstructing the first block using the set of motion vectors.

In accordance with some embodiments, a method of video encoding is performed at a computing system having memory and one or more processors. The method includes (i) obtaining video data comprising a plurality of blocks, including a first block; (ii) obtaining a set of motion vector predictors (MVPs) corresponding to a plurality of subblocks of the first block; (iii) obtaining a set of motion vectors for the plurality of subblocks; (iv) obtaining a set of motion vector differences (MVDs) for the plurality of subblocks by comparing the set of MVPs and the set of motion vectors; and (v) signaling, in a video bitstream, the set of MVDs.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding and/or decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes deriving and using subblock motion vector differences (MVDs) for motion coding. For example, deriving subblock motion vectors (MVs) may include deriving subblock motion vector predictors (MVPs), then deriving subblock MVDs, and then deriving the MVs by adding the subblock MVPs to the associated subblock MVDs. Deriving and using the MVDs for subblock motion can improve accuracy and coding efficiency and reduce encoding/decoding loss.

Example Systems and Devices

Figure 1:
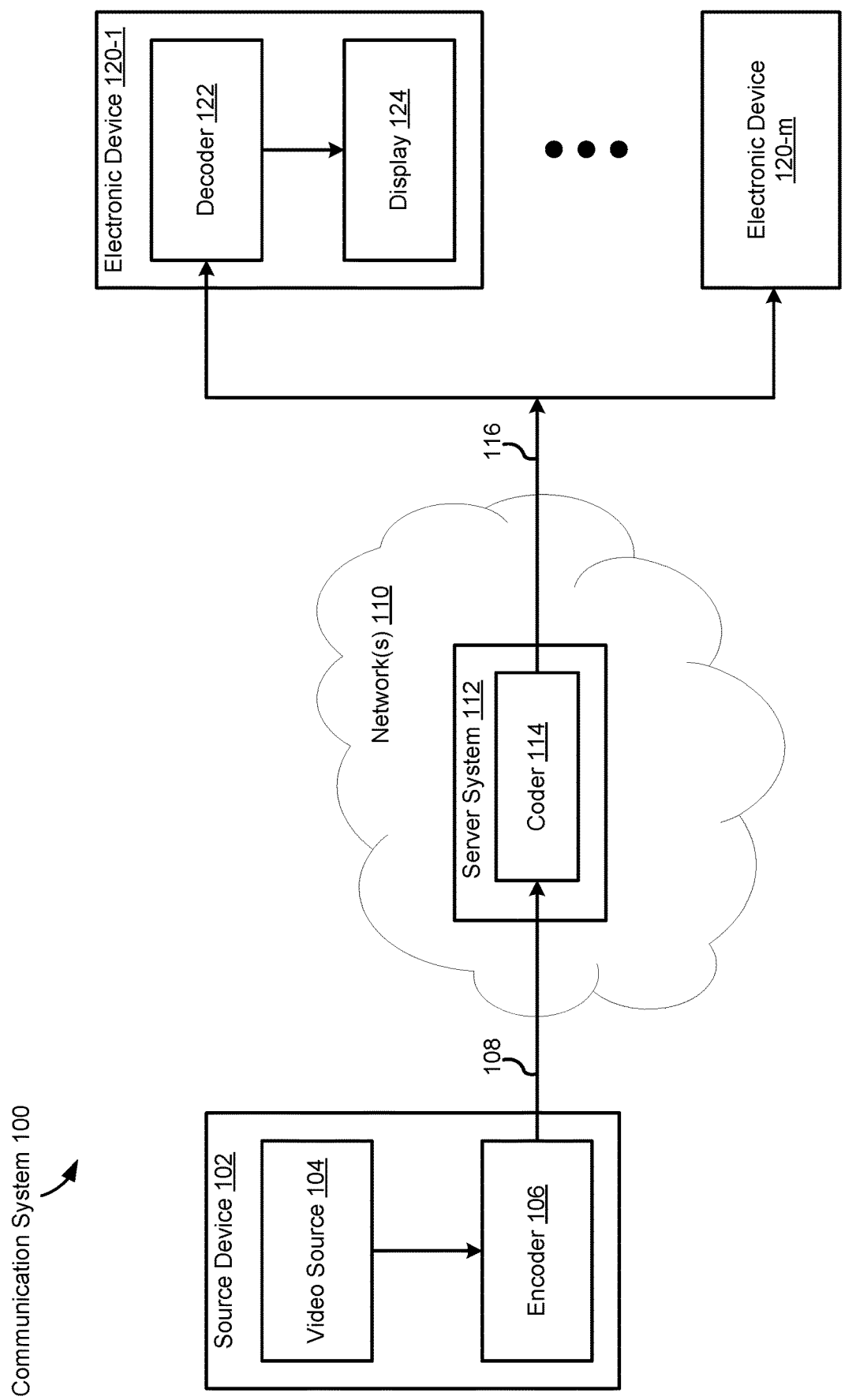
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
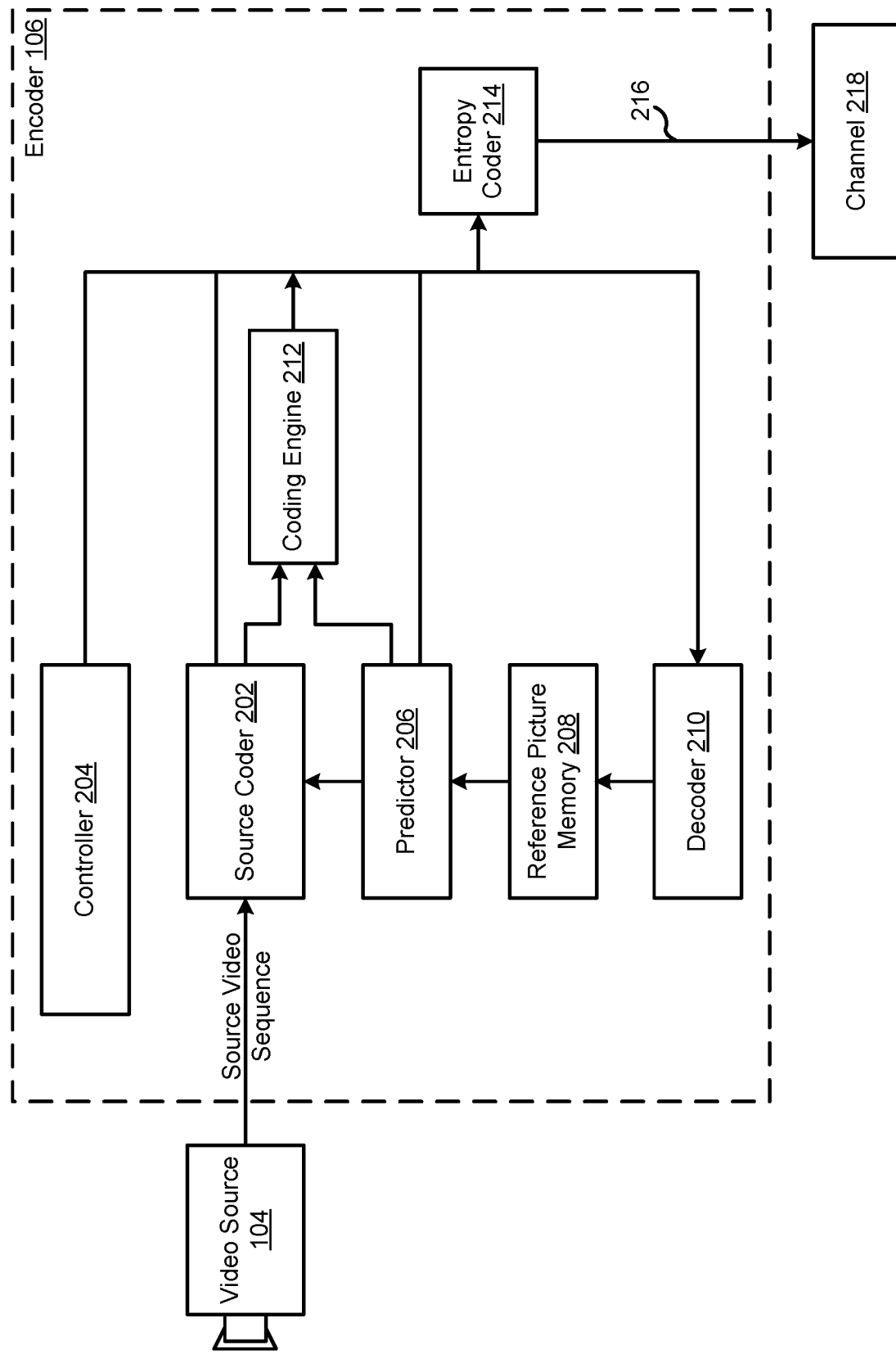
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A predictive picture may be coded and decoded using intra prediction or inter prediction using at most one motion vector and reference index to predict the sample values of each block. A bi-directionally predictive picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
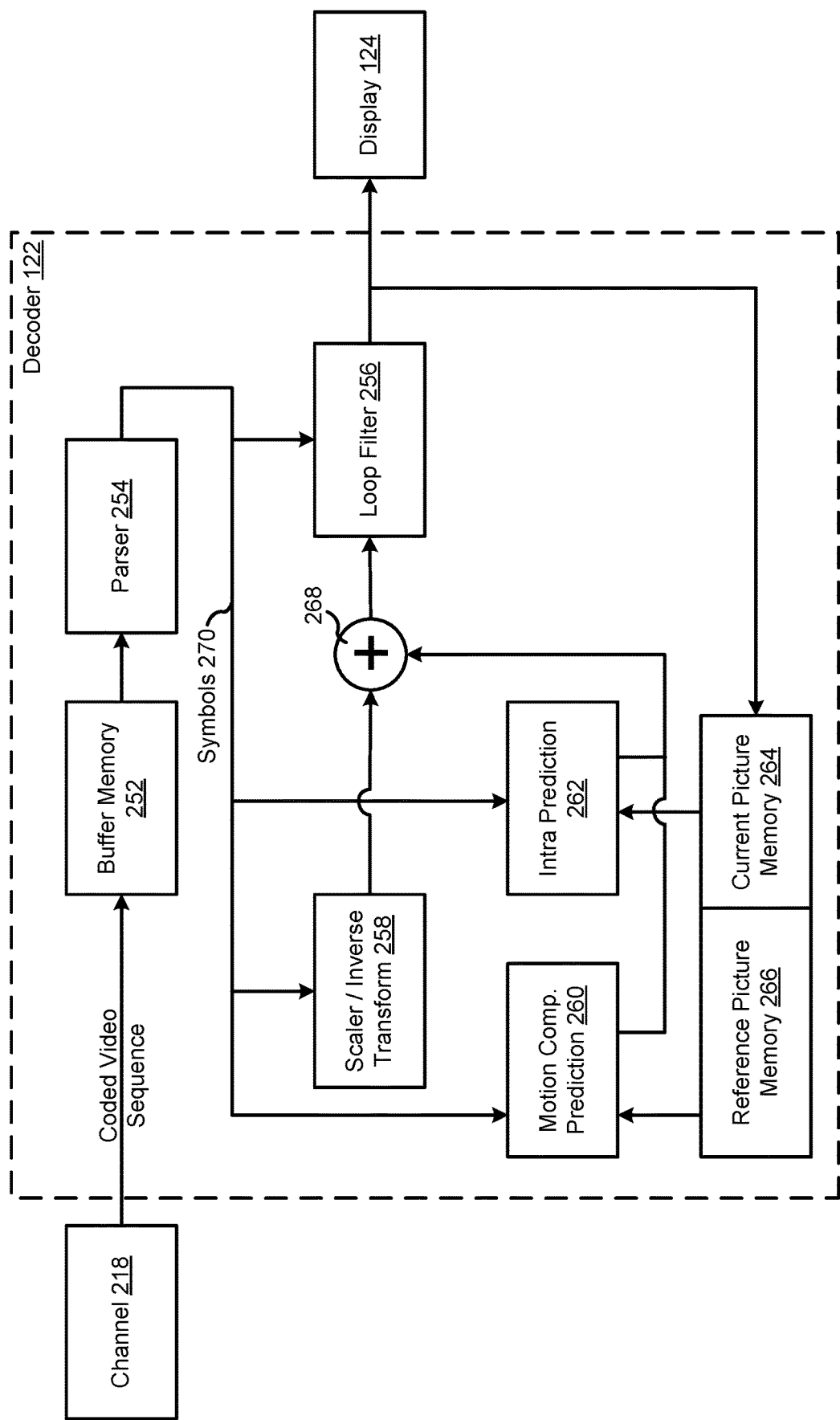
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
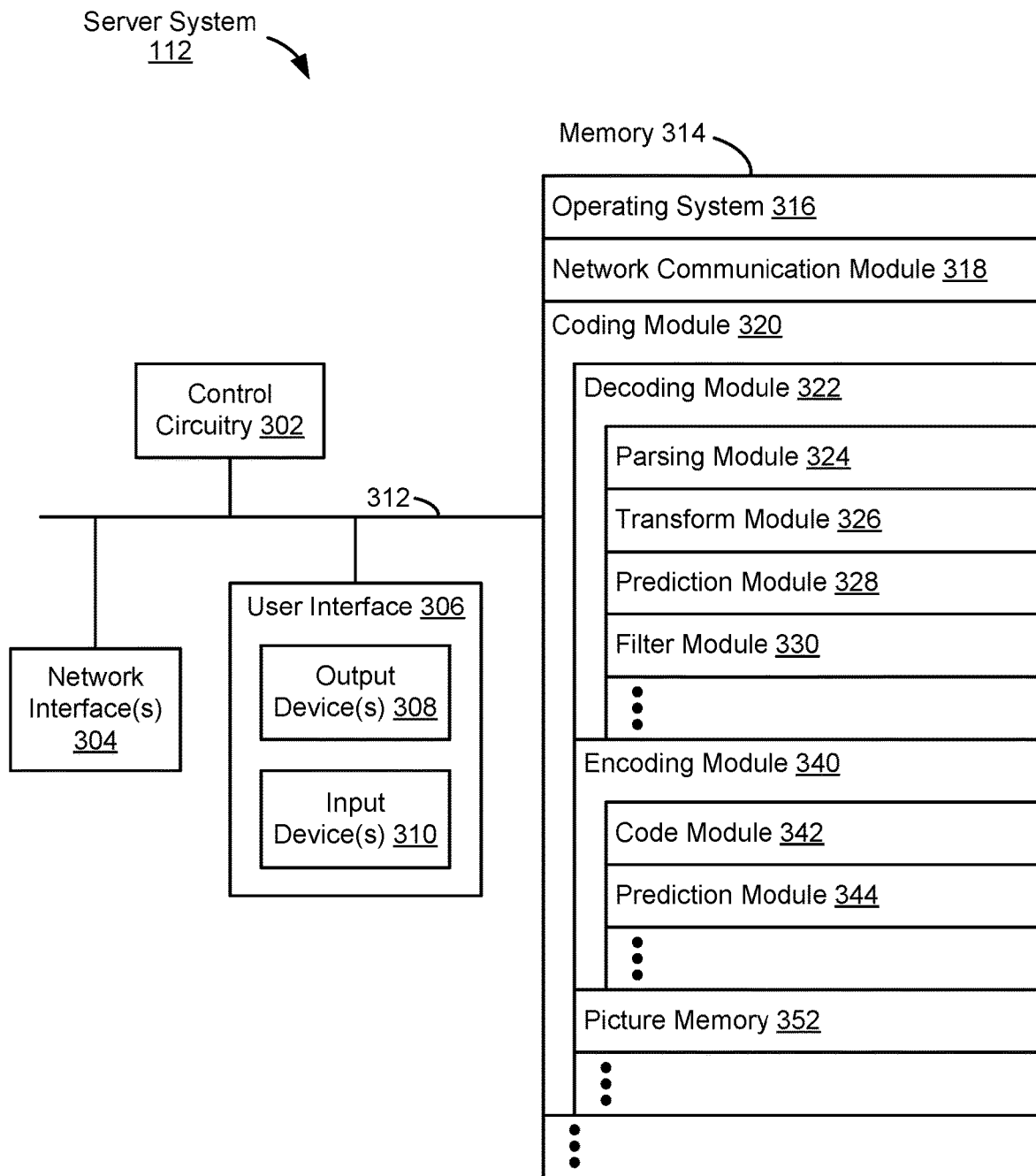
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANbus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

As discussed previously, an inter-predicted block is a block in a video compression stream that is expressed in terms of one or more neighboring blocks. For each inter-predicted coding unit (CU), motion parameters such as motion vectors, reference picture indices, and a reference picture list usage index, may be used for inter-predicted sample generation. The motion parameters can be signaled in an explicit or implicit manner. When a CU is coded with skip mode, the CU may be associated with a prediction unit (PU) and not have significant residual coefficients, e.g., no coded motion vector delta or reference picture index. A merge mode may be specified where the motion parameters for the current CU are obtained from neighboring CUs, including spatial and temporal candidates. The merge mode can be applied to any inter-predicted CU, not only for a skip mode. An alternative to merge mode is the explicit transmission of motion parameters, where a motion vector, a corresponding reference picture index for each reference picture list, and a reference picture list usage flag are signaled explicitly per each CU.

Figure 4A:
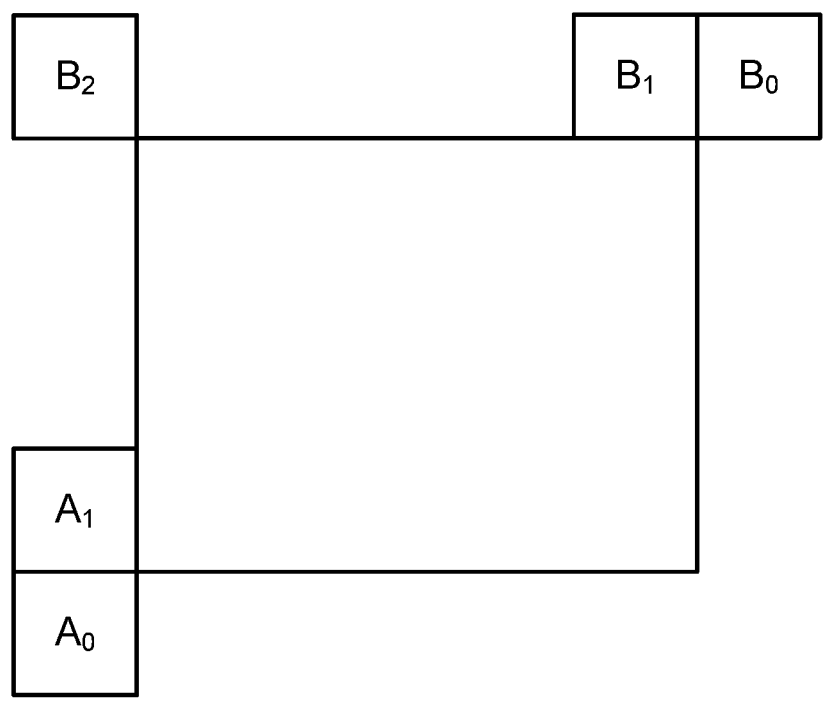
FIG. 4A illustrates example positions of spatial block candidates in accordance with some embodiments.

FIG. 4A illustrates example positions of spatial block candidates in accordance with some embodiments. For example, a maximum of four merge candidates are selected among candidates located in the positions $A_0$, $A_1$, $B_0$, $B_1$, and/or $B_2$. In some embodiments, the (scanning) order of derivation is $B_1$, $A_1$, $B_0$, $A_0$, and $B_2$. In some embodiments, the position $B_2$ is considered only when a CU at position $A_0$, $B_0$, $B_1$, and/or $A_1$ is not available (e.g., because it belongs to another slice or tile) or is intra coded. In some embodiments, other spatial neighbor blocks are scanned.

In order to improve the coding efficiency and reduce the transmission overhead of motion vector, the subblock level motion vector refinement can be applied to extend the CU level temporal motion vector prediction (TMVP). The subblock-based TMVP (SbTMVP) allows inheriting the motion information at subblock-level from the collocated reference picture. Each subblock of a large size CU can have its own motion information without explicitly transmitting the block partition structure or motion information. For example, an SbTMVP process can obtain motion information for each subblock in three steps. In this example, the first step is the derivation of a displacement vector (DV) of the current CU. The second step is to check the availability of the SbTMVP candidate and derive the central motion. The third step is to derive the subblock motion information from the corresponding subblock by the DV. Unlike TMVP candidate derivation that always derives the temporal motion vectors from the collocated block in the reference frame, SbTMVP can apply a DV which is derived from the MV of the left neighboring CU of the current CU to find the corresponding subblock in the collocated picture for each subblock of the current CU. In the case where the corresponding subblock is not inter-coded, the motion information of the current subblock can be set to be the central motion.

Thus, SbTMVP uses a motion field in a collocated picture to improve motion vector prediction and merge mode for CUs in the current picture. For example, the same collocated picture used by a TMVP process can be used for SbTMVP. SbTMVP differs from TMVP in the following two main aspects. First, TMVP predicts motion at CU level whereas SbTMVP predicts motion at sub-CU level. Second, TMVP fetches the temporal motion vectors from the collocated block in the collocated picture (e.g., the collocated block is the bottom-right or center block relative to the current CU), however, SbTMVP applies a motion shift before fetching the temporal motion information from the collocated picture, where the motion shift is obtained from a motion vector from one of the spatial neighboring blocks of the current CU. In this way, subblock MVPs can be inherited from collocated pictures.

Figure 4B:
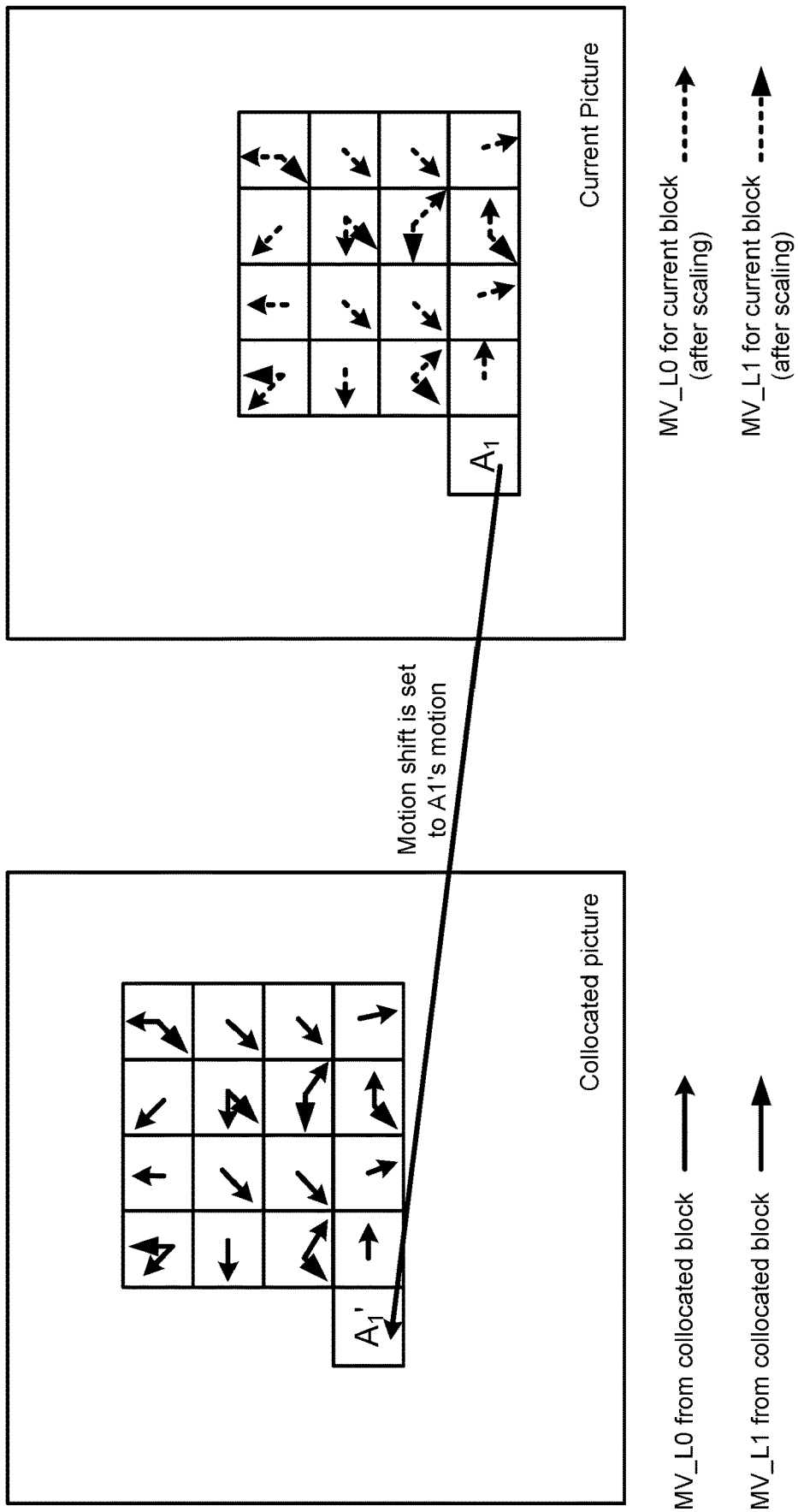
FIG. 4B illustrates example subblock motion fields in accordance with some embodiments.

FIG. 4B illustrates example subblock motion fields in accordance with some embodiments. The SbTMVP process is illustrated in FIG. 4B. For example, SbTMVP predicts the motion vectors of the sub-CUs within the current CU in two steps. In the first step, the spatial neighbor A1 in FIG. 4B is examined. If A1 has a motion vector that uses the collocated picture as its reference picture, this motion vector is selected to be the motion shift (or displacement vector) to be applied. If no such motion is identified, then the motion shift can be set to (0, 0).

In the second step, the motion shift identified in step 1 is applied (e.g., added to the current block's coordinates) to obtain sub-CU-level motion information (e.g., motion vectors and reference indices) from the collocated picture as shown in FIG. 4B. The example of FIG. 4B assumes the motion shift is set to block A1's motion. Then, for each sub-CU, the motion information of its corresponding block (e.g., the smallest motion grid that covers the center sample) in the collocated picture is used to derive the motion information for the sub-CU. After the motion information of the collocated sub-CU is identified, it is converted to the motion vectors and reference indices of the current sub-CU in a similar way as a TMVP process (e.g., in HEVC), where temporal motion scaling is applied to align the reference pictures of the temporal motion vectors to those of the current CU.

In some embodiments, a combined subblock-based merge list that contains SbTMVP candidates and affine merge candidates is used for the signaling of a subblock-based merge mode. In some embodiments, the SbTMVP mode is enabled/disabled by a sequence parameter set (SPS) flag. For example, if the SbTMVP mode is enabled, the SbTMVP predictor is added as the first entry of the list of subblock based merge candidates, and followed by the affine merge candidates. The size of subblock based merge list is signaled in SPS.

The sub-CU size used in SbTMVP can be fixed to be 8×8 (e.g., in VVC), and similar to an affine merge mode, the SbTMVP mode may be only applicable to the CU with both width and height are larger than or equal to 8. In some embodiments, the subblock size may be configurable to other sizes, such as 4×4. As an example, two collocated frames can be utilized to provide the temporal motion information for SbTMVP and TMVP in AMVP mode.

Figure 4C:
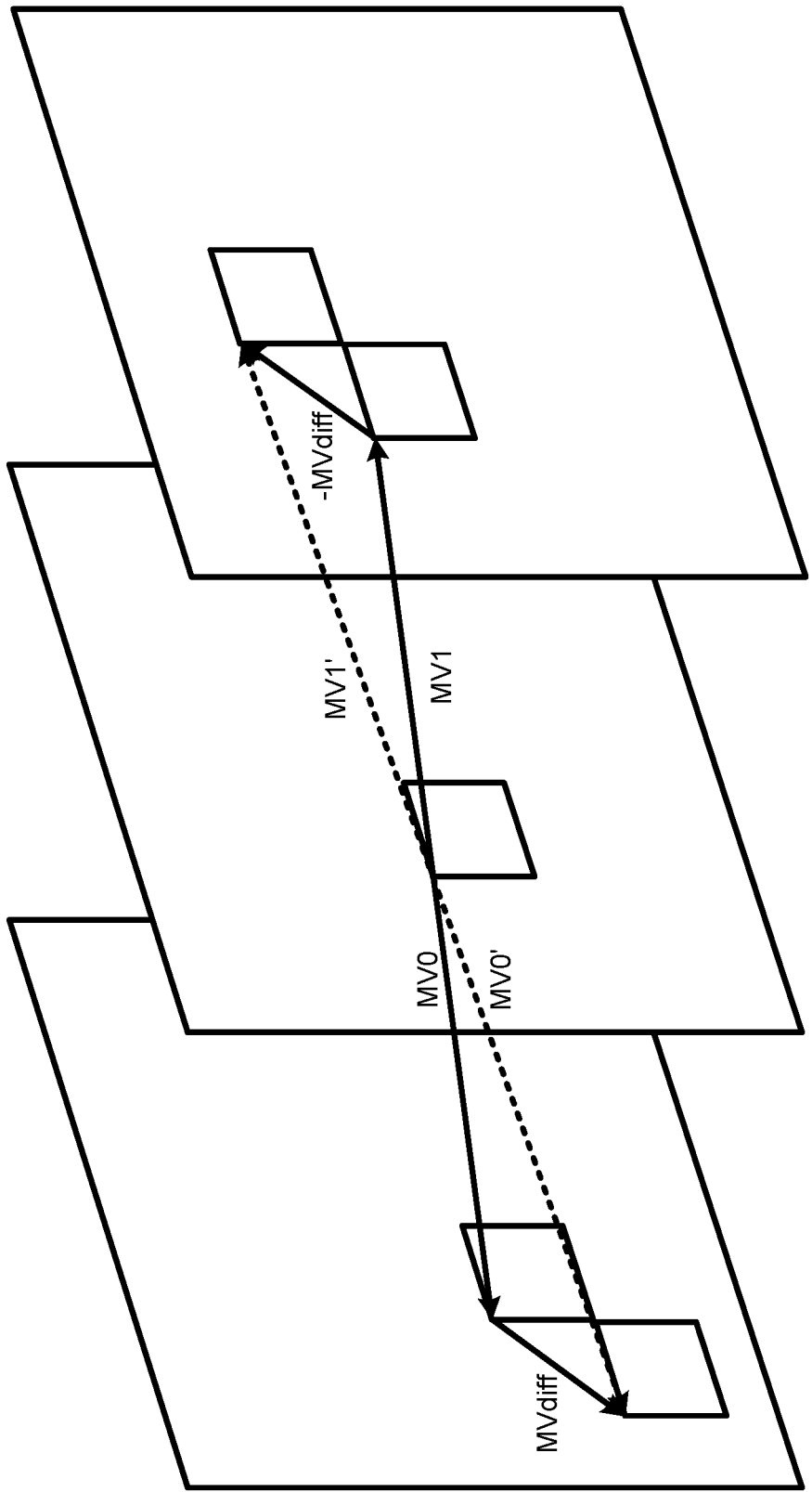
FIG. 4C illustrates example motion vector refinement in accordance with some embodiments.

FIG. 4C illustrates example motion vector refinement in accordance with some embodiments. In some embodiments, a decoder side motion vector refinement (DMVR) is applied to a CU coded in a regular merge mode. The pair of MVs obtained from the regular merge candidate can be used as an input of the DMVR process. DMVR applies a bilateral matching (BM) to refine the input MV pair ($mv_{L0}$, $mv_{L1}$) and uses the refined MV pair for the motion compensated prediction of both luma and chroma components (e.g., as illustrated in FIG. 4C). In some embodiments, the output MV of DMVR, referred to as a refined MV pair, obey the following equation:

$$mv_{refinedL0} = mv_{L0} + \Delta mv$$

$$mv_{refinedL1} = mv_{L1} - \Delta mv \qquad \text{Equation 1}$$

A motion vector difference, $\Delta mv$, can be applied to the input MV pair to obtain the refined MV pair by using an MVD mirroring property. For example, the input MV pair point to two different reference pictures that have equal difference in picture order count (POC) to the current picture and these two reference pictures are at different temporal directions.

In DMVR, a luma coded block can be divided into 16×16 subblocks for the MV refinement process. The $\Delta mv$ can be derived independently for each of the subblocks by performing an integer precision motion search followed by a fractional motion search. Finally, the subblock motion compensation (MC) can be applied using the refined MV pair {$mv_{refinedL0}$, $mv_{refinedL1}$}. In this way, a system can compare differences and select a motion vector with a minimum difference.

In some embodiments, a bi-directional optical flow (BDOF) is utilized. BDOF is used to refine the bi-prediction signal of a CU at the 4×4 subblock level. For example, BDOF is applied to a CU if it satisfies all the following conditions: (i) the CU is coded using "true" bi-prediction mode, e.g., one of the two reference pictures is prior to the current picture in display order and the other is after the current picture in display order; (ii) the distances (e.g., POC difference) from two reference pictures to the current picture are same; (iii) both reference pictures are short-term reference pictures; (iv) the CU is not coded using affine mode or the SbTMVP merge mode; (v) the CU has more than 64 luma samples; (vi) both CU height and CU width are larger than or equal to 8 luma samples; (vii) BCW weight index indicates equal weight; (viii) WP is not enabled for the current CU, and (ix) CIIP mode is not used for the current CU.

BDOF is only applied to the luma component. The BDOF mode is based on the optical flow concept, which assumes that the motion of an object is smooth. For each 4×4 subblock, a motion refinement ($v_x$, $v_y$) is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j), k = 0, 1,$$

of the two prediction signals are computed by directly calculating the difference between two neighboring samples:

$$\frac{\partial I^{(k)}}{\partial x}(i,j) = ((I^{(k)}(i+1,j) \gg \text{shift1}) - (I^{(k)}(i-1,j) \gg \text{shift1})) \qquad \text{Equation 2}$$

$$\frac{\partial I^{(k)}}{\partial y}(i,j) = ((I^{(k)}(i,j+1) \gg \text{shift1}) - (I^{(k)}(i,j-1) \gg \text{shift1}))$$

where $I^{(k)}(i,j)$ are the sample value at coordinate (i, j) of the prediction signal in list k, k=0, 1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as:

$$S_1 = \sum_{(i,j)\in\Omega} \text{Abs}(\psi_x(i,j)), \qquad \text{Equation 3}$$

$$S_3 = \sum_{(i,j)\in\Omega} \theta(i,j) \cdot \text{Sign}(\psi_x(i,j))$$

$$S_2 = \sum_{(i,j)\in\Omega} \psi_x(i,j) \cdot \text{Sign}(\psi_y(i,j))$$

$$S_5 = \sum_{(i,j)\in\Omega} \text{Abs}(\psi_y(i,j)),$$

$$S_6 = \sum_{(i,j)\in\Omega} \theta(i,j) \cdot \text{Sign}(\psi_y(i,j))$$

where, $$\psi_x(i,j) = \left(\frac{\partial I^{(1)}}{\partial x}(i,j) + \frac{\partial I^{(0)}}{\partial x}(i,j)\right) \gg n_a \qquad \text{Equation 4}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

where $\Omega$ is a 6×6 window around the 4×4 subblock, and the values of n a and n b are set equal to min(1, bitDepth−11) and min(4, bitDepth−8), respectively.

The motion refinement ($v_x$, $v_y$) is then derived using the cross- and auto-correlation terms using the following:

$$v_x = S_1 > 0 ? \text{clip3}(-th'_{BIO}, th'_{BIO}, -((S_3 \cdot 2^{n_b - n_a}) \gg \lfloor \log_2 S_1 \rfloor)) : 0$$

$$v_y = S_5 > 0 ? \text{clip3}(-th'_{BIO}, th'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)) : 0 \qquad \text{Equation 5}$$

where $S_{2,m} = S_2 \gg n_{S_2}$, $S_{2,s} = S_2 \& (2^{n_{S_2}} - 1)$ $th'_{BIO} = 2^{max(5, BD-7)}$. $\lfloor \cdot \rfloor$ is the floor function, and $n_{S_2} = 12$.

Based on the motion refinement and the gradients, the following adjustment is calculated for each sample in the 4×4 subblock:

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right)$$ Equation 6

The BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) >> \text{shift}$$ Equation 7

In some embodiments, these values are selected such that the multipliers in the BDOF process do not exceed 15-bit, and the maximum bit-width of the intermediate parameters in the BDOF process is kept within 32-bit.

In order to derive the gradient values, some prediction samples $I^{(k)}(i, j)$ in list k (k=0, 1) outside of the current CU boundaries are generated. As an example, the BDOF in VVC uses one extended row/column around the CU's boundaries. In order to control the computational complexity of generating the out-of-boundary prediction samples, prediction samples in the extended area (white positions) can be generated by taking the reference samples at the nearby integer positions (e.g., using a floor( ) operation on the coordinates) directly without interpolation, and the normal 8-tap motion compensation interpolation filter is used to generate prediction samples within the CU. These extended sample values are used in gradient calculation only. For the remaining steps in the BDOF process, if any sample and gradient values outside of the CU boundaries are needed, they can be padded (e.g., repeated) from their nearest neighbors.

In a sample-based BDOF, instead of deriving motion refinement $(v_x, v_y)$ on a block basis, it is performed per sample. For example, the coding block is divided into 8×8 subblocks. For each subblock, whether or not to apply BDOF is determined by checking the SAD between the two reference subblocks against a threshold. For example, if applying BDOF to a subblock, for every sample in the subblock, a sliding 5×5 window is used and the existing BDOF process is applied for every sliding window to derive $v_x$ and $v_y$. The derived motion refinement $(v_x, v_y)$ is applied to adjust the bi-predicted sample value for the center sample of the window.

Figure 4D:
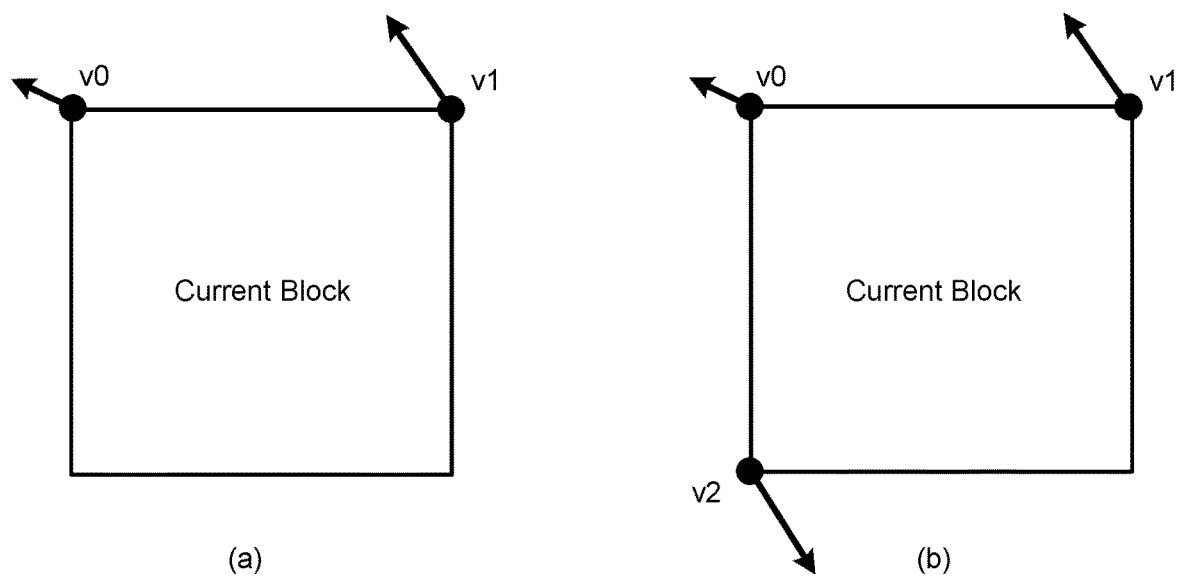
FIGS. 4D-4E illustrate example affine model models in accordance with some embodiments.

There are many types of motion such as zoom in/out, rotation, perspective motions, and the other irregular motions. Accordingly, a block-based affine transform motion compensation prediction can be applied. As shown in FIG. 4D, the affine motion field of the block is described by motion information of two control point (e.g., 4 parameter) as shown in (a) or three control point motion vectors (e.g., 6 parameter) as shown in (b).

For the 4-parameter affine motion model, motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = -\frac{mv_{1y} - mv_{0y}}{W}x + \frac{mv_{1x} - mv_{0x}}{W}y + mv_{0y} \end{cases}$$ Equation 8 which may also be described as $$\begin{cases} mv_x = ax + by + c \\ mv_y = -bx + ay + f \end{cases}$$ Equation 9

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$ Equation 10 which may also be described as $$\begin{cases} mv_x = ax + by + c \\ mv_y = dx + ey + f \end{cases}$$ Equation 11 where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 4E:
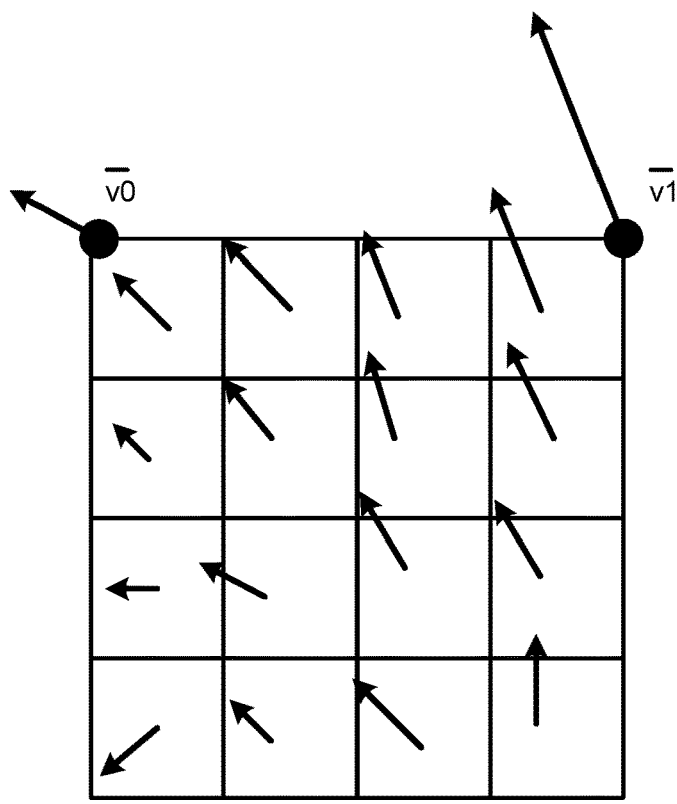

In order to simplify the motion compensation prediction, block based affine transform prediction can be applied. To derive motion vector of each 4×4 luma sub-block, the motion vector of the center sample of each sub-block, as shown in FIG. 4E, is calculated according to above equations, and rounded to 1/16 fraction accuracy. Then the motion compensation interpolation filters are applied to generate the prediction of each sub-block with derived motion vector. The sub-block size of chroma-components is also set to be 4×4. For example, the MV of a 4×4 chroma sub-block is calculated as the average of the MVs of the four corresponding 4×4 luma sub-blocks.

In the above subblock motion modes (e.g., subblock TMVP, subblock DMVR, and affine motion), the subblock motion vectors are derived implicitly based on coded MV field or assumptions on specific motion model. However, the optimal subblock MV may not follow the assumptions of the respective motion models, which decreases the encoding/decoding accuracy (coding efficiency).

Figure 5A:
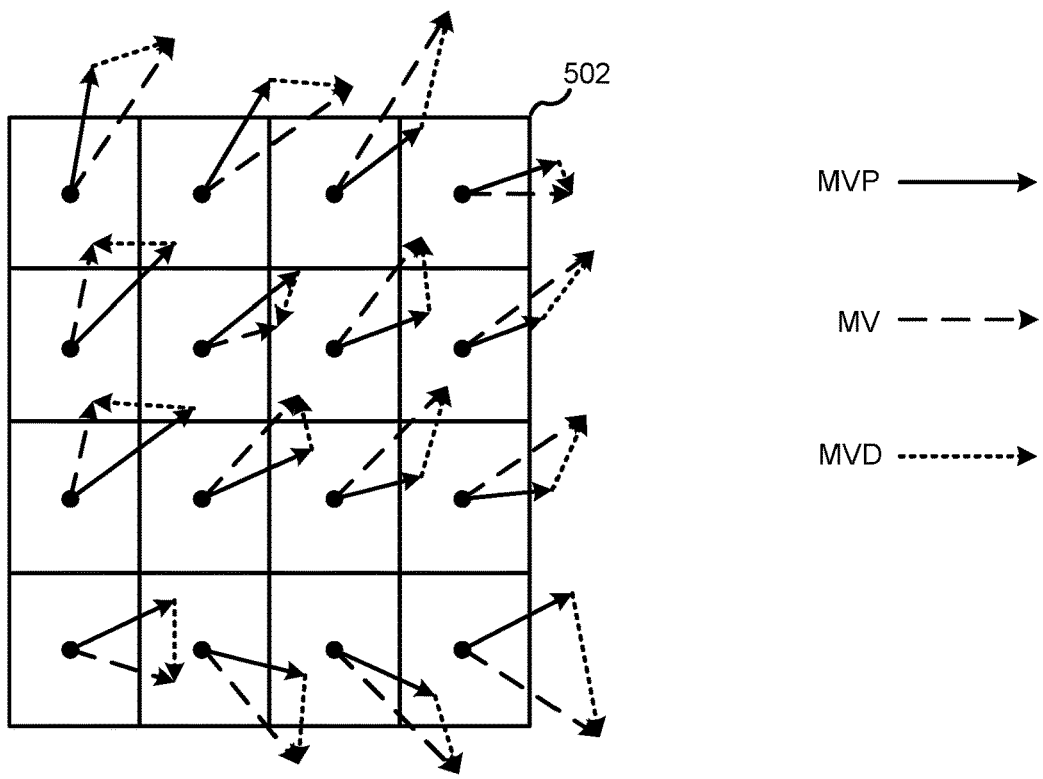
FIGS. 5A-5B illustrate example subblock motion vector differences in accordance with some embodiments.
Figure 5B:
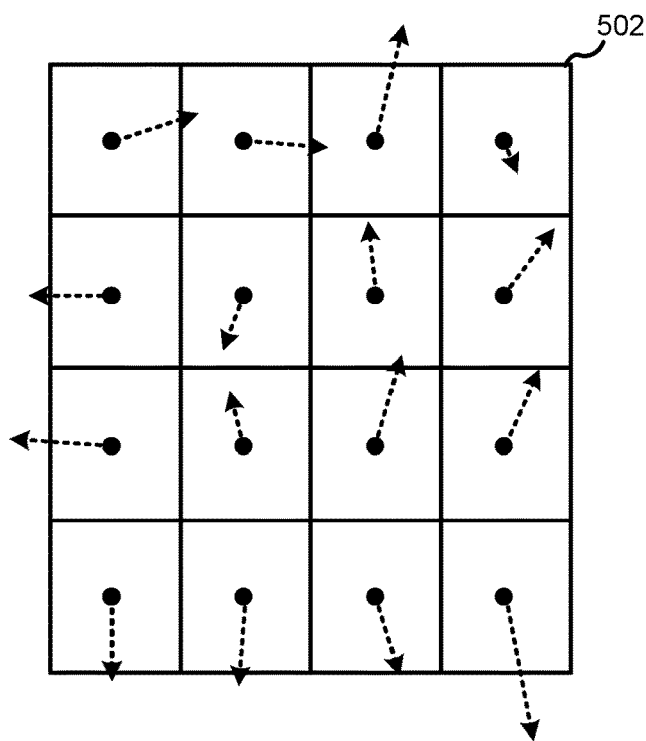

FIGS. 5A-5B illustrate example subblock motion vector differences in accordance with some embodiments. FIG. 5A shows respective motion vectors (MVs), motion vector predictors MVPs), and motion vector differences (MVDs) for each subblock of a current block 502. FIG. 5B shows the respective MVDs for each subblock.

Figure 6A:
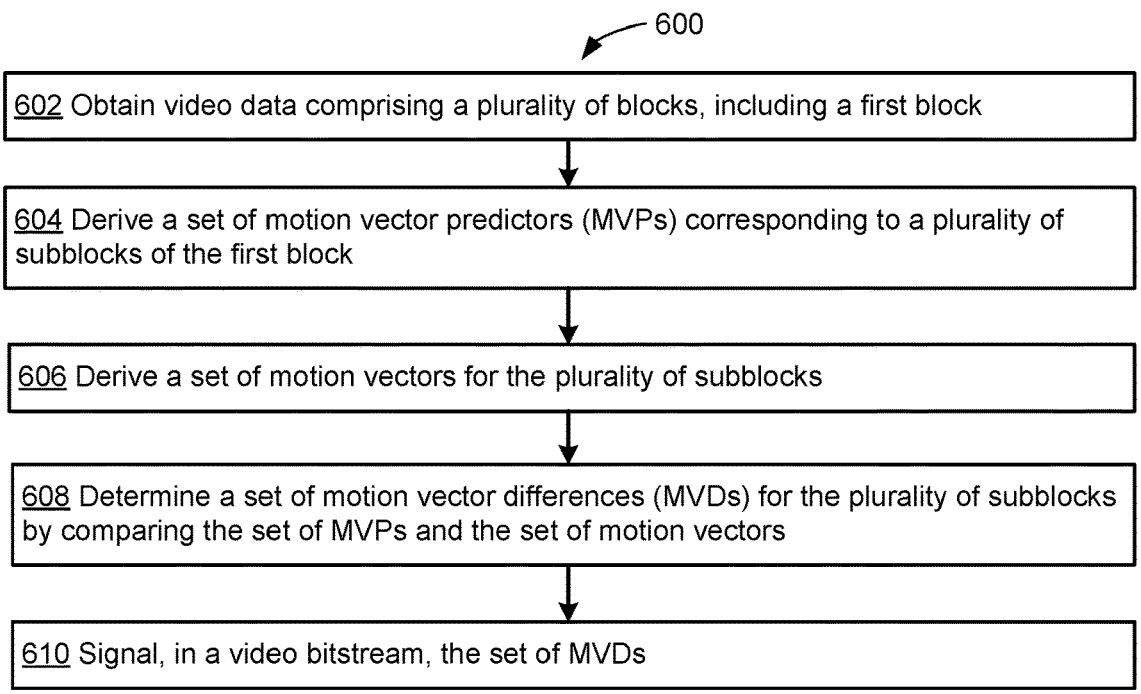
FIGS. 6A-6B are flow diagrams illustrating example methods of encoding and decoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system obtains (602) video data comprising a plurality of blocks, including a first block. The system derives (604) a set of motion vector predictors (MVPs) corresponding to a plurality of subblocks of the first block. The system derives (606) a set of motion vectors for the plurality of subblocks. The system determines (608) a set of motion vector differences (MVDs) for the plurality of subblocks by comparing the set of MVPs and the set of motion vectors. The system signals (610), in a video bitstream, the set of MVDs.

In some embodiments, at the encoder, the subblock MVDs, as shown in an example in FIG. 5B, are put in a M×N block (e.g., M and N equal to 4 luma samples in the example in FIG. 5B), and a transform process is applied on this block of MVDs, and one or multiple MVD coefficient blocks are derived. In some embodiments, the block of MVDs is further split into two blocks of MVDs, one with only the horizontal component, the other with only the vertical component. In some embodiments, each of the two blocks of MVDs is fed into the transform process to derive the transform coefficient block for the associated MVD block. In some embodiments, when the block or subblocks are inter bi-prediction mode, the subblock MVDs for each reference list are derived and transformed independently.

In some embodiments, the zero MVD is used for the reference list of the subblock when that reference list of the MVP of the subblock is not available. In some embodiments, the subblock is identified as unavailable when the reference list of its MVP is not available, and the shape-adaptive transform is applied to those subblocks that have an available MVD at the reference list.

In some embodiments, the MVD coefficients derived in transform domain are further quantized, and the quantized MVD coefficients are further fed into the entropy coder to encode the values of quantized MVD coefficients.

Figure 6B:
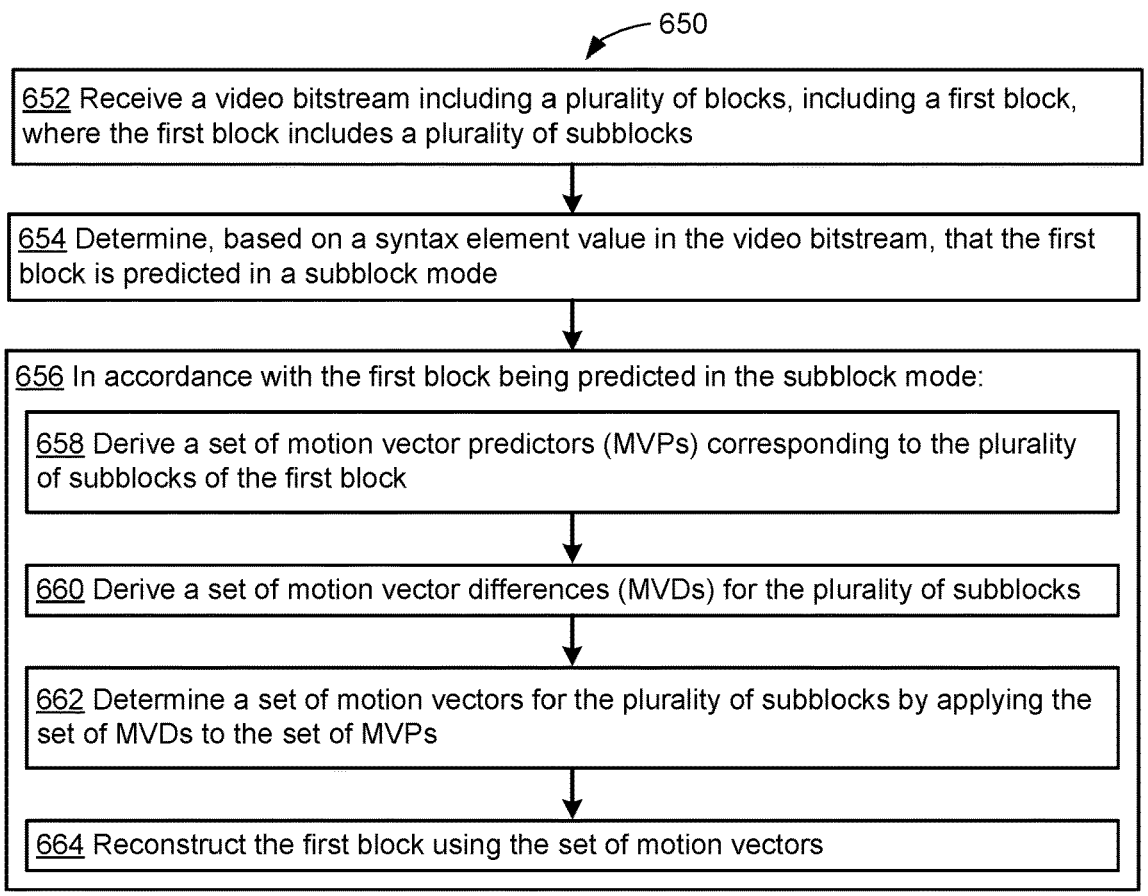

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) a video bitstream including a plurality of blocks, including a first block, where the first block includes a plurality of subblocks. The system determines (654) based on a syntax element value in the video bitstream, that the first block is predicted in a subblock mode. In accordance with the first block being predicted in the subblock mode (656): the system derives (658) a set of motion vector predictors (MVPs) corresponding to the plurality of subblocks of the first block. The system derives (660) a set of motion vector differences (MVDs) for the plurality of subblocks. The system determines (662) a set of motion vectors for the plurality of subblocks by applying the set of MVDs to the set of MVPs. The system reconstructs (664) the first block using the set of motion vectors.

In some embodiments, the system first derives subblock MVPs, then subblock MVDs are further coded, for each subblock, and the motion vector is derived by adding the subblock MVP and the associated subblock MVD. An example is shown in FIG. 5A, where a motion vector predictor (indicated by solid black arrows) is derived, then an MVD is applied for each subblock (indicated by dotted arrows), then the motion vector for each subblock is derived by adding the subblock MVP and the associated subblock MVD (indicated by dashed arrows).

In some embodiments, the subblock MVPs are derived using spatially neighboring block MVs based on a motion model (such as translational motion, affine motion, warp motion, or planar motion model). In some embodiments, the subblock MVPs are derived by coded motion vectors stored for a subblock in temporal collocated pictures, or derived by template matching, or derived by DMVR.

In some embodiments, at the decoder, one or multiple MVD coefficient blocks are first derived, and an inverse transform process is applied on these MVD coefficient blocks to derive the MVDs for each subblock. Then the subblock MVD is added on top of the associated subblock MVP to derive the subblock MV, which is used to perform the subblock motion compensation.

In some embodiments, one inverse transform is applied on one of the multiple MVD coefficient blocks to derive the block of horizontal component of subblock MVDs, and one inverse transform is applied on one of the multiple MVD coefficient blocks to derive the block of vertical component of subblock MVDs. In some embodiments, the block of horizontal component of subblock MVDs and the block of vertical component of subblock MVDs are merged into one block of MVDs. In some embodiments, when the block or subblocks are inter bi-prediction mode, the subblock MVDs for each reference list are processed separately.

In some embodiments, the zero MVD is used for the reference list of the subblock when that reference list of the MVP of the subblock is not available. In some embodiments, the subblock is identified as unavailable when the reference list of its MVP is not available, and the shape-adaptive transform is applied to those subblocks that have an available MVD at the reference list.

In some embodiments, the quantization step size is indicated by high-level syntax. In some embodiments, the precision of the subblock MVs and/or MVDs are determined by a high-level syntax. For example, the high-level syntax corresponds to a sequence level, a frame level, a slice level, or a tile level. In some embodiments, the high-level syntax is higher than a block level. For example, the high-level syntax may include a video parameter set (VPS), a sequency parameter set (SPS), a picture parameter set (PPS), an adaptive parameter set (APS), a slice header, a picture header, a tile header, and/or a CTU header. In some embodiments, the precision of the subblock MVs and/or MVDs may be signaled at coding block level. For example, a block level AMVR index may be used to indicate the precision of MV/MVD. In another example, a separate subblock MV precision syntax may be used.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments.

(A1) In one aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) receiving a video bitstream comprising a plurality of blocks, including a first block, wherein the first block comprises a plurality of subblocks; (ii) determining, based on a syntax element value in the video bitstream, that the first block is predicted in a subblock mode; and (iii) in accordance with the first block being predicted in the subblock mode: (a) deriving a set of motion vector predictors (MVPs) corresponding to the plurality of subblocks of the first block; (b) deriving a set of motion vector differences (MVDs) for the plurality of subblocks; (c) determining a set of motion vectors for the plurality of subblocks by applying the set of MVDs to the set of MVPs; and (d) reconstructing the first block using the set of motion vectors. For example, first subblock MVPs are derived, then subblock MVDs are derived. Then, for each subblock, the motion vector is derived by adding the subblock MVP and the associated subblock MVD.

(A2) In some embodiments of A1, the set of MVPs are derived using a motion model and one or more spatial neighbor motion vectors. For example, the subblock MVPs are derived using spatially neighboring block MVs based on a motion model (such as translational motion, affine motion, warp motion, or planar motion model).

(A3) In some embodiments of A1 or A2, the set of MVPs are derived based on one or more coded motion vectors corresponding to one or more temporally-collocated blocks. For example, the MVPs are derived by coded motion vectors stored for a subblock in temporal collocated pictures. In some embodiments, the set of MVPs are obtained using template matching and/or decoder side motion vector refinement (DMVR).

(A4) In some embodiments of any of A1-A3, the method further includes obtaining one or more MVD coefficient blocks from the video bitstream, the one or more MVD coefficient blocks corresponding to the plurality of subblocks of the first block, where the set of MVDs are obtained by performing an inverse transform on the one or more MVD coefficient blocks. For example, the one or more MVD coefficient blocks are determined using video data from the video bitstream.

(A5) In some embodiments of A4, the one or more MVD coefficient blocks comprise a first MVD coefficient block corresponding to horizontal MVD components and a second MVD coefficient block corresponding to vertical MVD components. In some embodiments, a first inverse transform is applied a first MVD coefficient block to derive a block of horizontal components of subblock MVDs, and a second inverse transform is applied a second coefficient block to derive a block of vertical component of subblock MVDs.

(A6) In some embodiments of A5, the method further includes: (i) obtaining the horizontal MVD components from the first MVD coefficient block; and (ii) obtaining the vertical MVD components from the second MVD coefficient block, where the set of MVDs are obtained by combining the horizontal MVD components and the vertical MVD components. For example, the block of horizontal components of subblock MVDs and the block of vertical components of subblock MVDs are merged into a single block of MVDs.

(A7) In some embodiments of A4 or A5, the one or more MVD coefficient blocks include: (i) a first MVD coefficient block corresponding to horizontal MVD components for a first prediction; (ii) a second MVD coefficient block corresponding to vertical MVD components the first prediction; (iii) a third MVD coefficient block corresponding to horizontal MVD components for a second prediction; and (iv) a fourth MVD coefficient block corresponding to vertical MVD components for the second prediction. For example, when the block or subblocks are inter bi-prediction mode, the subblock MVDs for each reference list may be processed separately.

(A8) In some embodiments of any of A4-A7, a zero MVD is assigned to one or more of the plurality of subblocks that do not have an available MVP. For example, the zero MVD is used for the reference list of the subblock when that reference list of the MVP of the subblock is not available.

(A9) In some embodiments of any of A4-A8, one or more subblocks of the plurality of subblocks are designated as unavailable in accordance with a determination that the one or more subblocks do not have an available MVP.

(A10) In some embodiments of A9, a shape-adaptive transform is applied to the one or more MVD coefficient blocks to obtain the set of MVDs. For example, a subblock is identified as unavailable when the reference list of its MVP is not available, and a shape-adaptive transform is applied to the subblocks that have available MVPs. In some embodiments, the shape-adaptive transform is a 4-point and/or 2-point transform. In some embodiments, the shape-adaptive transform is applied in conjunction with another transform (e.g., a DCT or Hadamard transform).

(A11) In some embodiments of any of A4-A10, quantized MVD coefficients are obtained from the one or more MVD coefficient blocks, and the set of MVDs are derived from the quantized MVD coefficients. For example, the MVD coefficients derived in the transform domain can be further quantized, and the quantized MVD coefficients are further fed into an entropy coder to encode the values of quantized MVD coefficients.

(A12) In some embodiments of A11, a quantization step size is obtained from high-level syntax in the video bitstream. For example, the high-level syntax corresponds to a sequence level, a frame level, a slice level, or a tile level. In some embodiments, the high-level syntax is higher than a block level. For example, the high-level syntax may include VPS, SPS, PPS, APS, a slice header, a picture header, a tile header, and/or a CTU header.

(A13) In some embodiments of any of A1-A12, a precision for the set of MVDs is obtained from high-level syntax in the video bitstream. In some embodiments, the precision of the subblock MVs and/or MVDs are determined by high-level syntax.

(A14) In some embodiments of any of A1-A12, a precision for the set of MVDs is obtained from block-level syntax in the video bitstream. In some embodiments, the precision of the subblock MVs and/or MVDs is signaled at coding block level. For example, a block-level AMVR index may be used to indicate the precision of MV/MVD. As another example, a separate subblock MV precision syntax may be used.

(A15) In some embodiments of A1-A14, the video bitstream corresponds to video encoded in accordance with any of B1-B8 below.

(B1) In another aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) obtaining video data comprising a plurality of blocks, including a first block; (ii) deriving a set of motion vector predictors (MVPs) corresponding to a plurality of subblocks of the first block; (iii) deriving a set of motion vectors for the plurality of subblocks; (iv) determining a set of motion vector differences (MVDs) for the plurality of subblocks by comparing the set of MVPs and the set of motion vectors; and (v) signaling, in a video bitstream, the set of MVDs.

(B2) In some embodiments of B1, the set of MVPs are derived using a motion model and one or more spatial neighbor motion vectors.

(B3) In some embodiments of B1 or B2, the set of MVPs are derived based on one or more coded motion vectors corresponding to one or more temporally-collocated blocks.

(B4) In some embodiments of any of B1-B3, the method further includes obtaining an MVD coefficient block by applying a transform to the set of MVDs, where signaling the set of MVDs comprises signaling the MVD coefficient block. For example, the transform is a discrete cosine transform (DCT), a Hadamard transform, an eigenvector transform, or a Karhunen-Loeve transform (KLT). As an example, at the encoder, the subblock MVDs are put in a M×N block (e.g., M and N equal to 4 luma samples), and a transform process is applied on this block of MVDs, and one or multiple MVD coefficient blocks are derived.

(B5) In some embodiments of B4, obtaining the MVD coefficient block includes assigning a zero MVD to each subblock in the plurality of subblocks for which a reference MVP is unavailable.

(B6) In some embodiments of B4 or B5, obtaining the MVD coefficient block includes: (i) designating a subblock in the plurality of subblocks as unavailable in accordance with a determination that the subblock does not have an available MVP; and (ii) applying a shape-adaptive transform to available subblocks of the plurality of subblocks.

(B7) In some embodiments of any of B1-B6, the method further includes obtaining, from the set of MVDs, a first MVD block corresponding to horizontal MVD components and a second MVD block corresponding to vertical MVD components. For example, the block of MVDs is further split into two blocks of MVDs, one with only the horizontal component, the other with only the vertical component. In some embodiments, respective first and second MVD blocks are obtained for each prediction of one or more motion predictions for a particular subblock of the plurality of subblocks.

(B8) In some embodiments of B7, the method further includes: (i) obtaining a first MVD coefficient block by applying a transform to the first MVD block; and (ii) obtaining a second MVD coefficient block by applying the transform to the second MVD block, where signaling the set of MVDs comprises signaling the first and second MVD coefficient blocks. For example, each of the blocks of MVDs is fed into the transform process to derive the transform coefficient block for the associated MVD block.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A15 and B1-B8 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A15 and B1-B8 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks, including a first block, wherein the first block comprises a plurality of subblocks;
   determining, based on a syntax element value in the video bitstream, that the first block is predicted in a subblock mode; and
   when the first block is predicted in the subblock mode:
      deriving a set of motion vector predictors (MVPs) corresponding to the plurality of subblocks of the first block;
      parsing, from the video bitstream, an MVD coefficient block for the first block, the MVD coefficient block having a size equal to a number of samples in the first block;
      deriving a set of motion vector differences (MVDs) for the plurality of subblocks by performing an inverse transform on the MVD coefficient block;
      determining a set of motion vectors for the plurality of subblocks by applying the set of MVDs to the set of MVPs; and reconstructing the first block using the set of motion vectors.

2. The method of claim 1, wherein the set of MVPs are derived using a motion model and one or more spatial neighbor motion vectors.

3. The method of claim 1, wherein the set of MVPs are derived based on one or more coded motion vectors corresponding to one or more temporally-collocated blocks.

4. The method of claim 1, wherein the MVD coefficient block is a first MVD coefficient block corresponding to horizontal MVD components; and
the method further comprises parsing a second MVD coefficient block corresponding to vertical MVD components.

5. The method of claim 4, further comprising:
obtaining the horizontal MVD components from the first MVD coefficient block; and
obtaining the vertical MVD components from the second MVD coefficient block;
wherein the set of MVDs are obtained by combining the horizontal MVD components and the vertical MVD components.

6. The method of claim 1, wherein the MVD coefficient block is one of:
a first MVD coefficient block corresponding to horizontal MVD components for a first prediction;
a second MVD coefficient block corresponding to vertical MVD components the first prediction;
a third MVD coefficient block corresponding to horizontal MVD components for a second prediction; or
a fourth MVD coefficient block corresponding to vertical MVD components for the second prediction.

7. The method of claim 1, wherein a zero MVD is assigned to one or more of the plurality of subblocks that do not have an available MVP.

8. The method of claim 1, wherein one or more subblocks of the plurality of subblocks are designated as unavailable in accordance with a determination that the one or more subblocks do not have an available MVP.

9. The method of claim 8, wherein the inverse transform comprises a shape-adaptive transform.

10. The method of claim 1, wherein quantized MVD coefficients are obtained from the MVD coefficient block, and wherein the set of MVDs are derived from the quantized MVD coefficients.

11. The method of claim 10, wherein a quantization step size is obtained from high-level syntax in the video bitstream.

12. The method of claim 1, wherein a precision for the set of MVDs is obtained from high-level syntax in the video bitstream.

13. The method of claim 1, wherein a precision for the set of MVDs is obtained from block-level syntax in the video bitstream.

14. A method of video encoding performed at a computing system having memory and one or more processors, the method comprising:
receiving video data comprising a plurality of blocks, including a first block, wherein the first block comprises a plurality of subblocks;
determining that the first block is to be encoded in a subblock mode;
obtaining a set of motion vector predictors (MVPs) corresponding to the plurality of subblocks of the first block;
obtaining a set of motion vectors for the plurality of subblocks;
obtaining a set of motion vector differences (MVDs) for the plurality of subblocks by comparing the set of MVPs and the set of motion vectors;
obtaining an MVD coefficient block by transforming the set of MVDs, wherein the MVD coefficient block has a size equal to a number of samples in the first block; and
signaling the MVD coefficient block in a video bitstream.

15. The method of claim 14, wherein the set of MVPs are derived using a motion model and one or more spatial neighbor motion vectors.

16. The method of claim 14, wherein the set of MVPs are derived based on one or more coded motion vectors corresponding to one or more temporally-collocated blocks.

17. The method of claim 14, wherein the MVD coefficient block is a first MVD coefficient block corresponding to horizontal MVD components; and
the method further comprises obtaining a second MVD coefficient block corresponding to vertical MVD components.

18. A method of processing visual media data, the method comprising:
obtaining a source video sequence that comprises a plurality of frames; and
performing a conversion between the source video sequence and a video bitstream of visual media data according to a format rule,
wherein the video bitstream comprises a syntax element and a plurality of encoded blocks, including a first block composed of a plurality of subblocks; and
wherein the format rule specifies that:
the first block is to be determined to be predicted in a subblock mode based on the syntax element; and
when the first block is predicted in the subblock mode:
a set of motion vector predictors (MVPs) corresponding to the plurality of subblocks of the first block is to be derived;
a motion vector difference (MVD) coefficient block for the first block is to be parsed from the video bitstream, the MVD coefficient block having a size equal to a number of samples in the first block;
a set of MVDs is to be derived for the plurality of subblocks by performing an inverse transform on the MVD coefficient block;
a set of motion vectors is to be determined for the plurality of subblocks by applying the set of MVDs to the set of MVPs; and
the first block is to be reconstructed using the set of motion vectors.

19. The method of claim 18, wherein the set of MVPs are derived using a motion model or one or more coded motion vectors corresponding to one or more temporally-collocated blocks.

* * * * *